United States Patent
Westbye et al.

(10) Patent No.: US 10,750,740 B2
(45) Date of Patent: *Aug. 25, 2020

(54) AGRICULTURAL FORMULATIONS WITH AMIDES AND ACYL MORPHOLINES

(71) Applicant: AKZO NOBEL CHEMICALS INTERNATIONAL B.V., Amersfoort (NL)

(72) Inventors: Peter Westbye, Stenungsund (SE); Karin Hammarstrand, Kode (SE); Martina Andersson, Hönö (SE)

(73) Assignee: NOURYON CHEMICALS INTERNATIONAL B.V., Arnhem (NL)

( * ) Notice: Subject to any disclaimer, the term of this patent is extended or adjusted under 35 U.S.C. 154(b) by 196 days.

This patent is subject to a terminal disclaimer.

(21) Appl. No.: 14/359,632

(22) PCT Filed: Nov. 22, 2012

(86) PCT No.: PCT/EP2012/073368
§ 371 (c)(1),
(2) Date: May 21, 2014

(87) PCT Pub. No.: WO2013/076200
PCT Pub. Date: May 30, 2013

(65) Prior Publication Data
US 2014/0315718 A1    Oct. 23, 2014

Related U.S. Application Data

(60) Provisional application No. 61/563,970, filed on Nov. 28, 2011.

(30) Foreign Application Priority Data

Nov. 24, 2011 (EP) .................................... 11190506

(51) Int. Cl.
| | | |
|---|---|---|
| *A01N 25/02* | (2006.01) | |
| *A01N 39/00* | (2006.01) | |
| *A01N 25/04* | (2006.01) | |
| *A01N 43/653* | (2006.01) | |
| *A01N 43/50* | (2006.01) | |

(52) U.S. Cl.
CPC ............. *A01N 25/02* (2013.01); *A01N 25/04* (2013.01); *A01N 39/00* (2013.01); *A01N 43/50* (2013.01); *A01N 43/653* (2013.01)

(58) Field of Classification Search
CPC combination set(s) only.
See application file for complete search history.

(56) References Cited

U.S. PATENT DOCUMENTS

| | | | |
|---|---|---|---|
| 4,452,630 A | 6/1984 | Dal Moro et al. | |
| 8,791,145 B2 * | 7/2014 | Westbye ................ | A01N 25/02 514/341 |
| 2009/0062120 A1 | 3/2009 | Sowa et al. | |
| 2009/0181850 A1 * | 7/2009 | Stern ...................... | A01N 25/02 504/130 |

FOREIGN PATENT DOCUMENTS

| | | |
|---|---|---|
| EP | 1 961 301 A1 | 8/2008 |
| GB | 1 299 044 A | 12/1972 |
| JP | H07-033605 A | 2/1995 |
| WO | 95/15685 A1 | 6/1995 |
| WO | 97/47707 A1 | 12/1997 |
| WO | 2007/140332 A2 | 12/2007 |

(Continued)

OTHER PUBLICATIONS

Mueller, D., "Fungicides:Triazoles", Integrated Crop Management, 496.13 (2006) p. 1-3.*
Cincotti, Alberto, et al. "Liquid—Liquid Equilibria of Hydrocarbons with N-Formylmorpholine." Journal of Chemical & Engineering Data 44.3 (1999): 480-483.*
Ishimura et al. "Agrochemical emulsion compsn. used as herbicide—contains phenyl urea type cpd., low polarity solvent and polar solvent to prevent crystal pptn," WPI/THOMSON, vol. 1995, No. 15, Feb. 3, 1995, XP-002601846.

(Continued)

*Primary Examiner* — John Pak
*Assistant Examiner* — Daniel L Branson
(74) *Attorney, Agent, or Firm* — Lorenz & Kopf, LLP

(57) ABSTRACT

A formulation is provided comprising a) at least one agriculturally active ingredient; b) at least one amide of formula (I)

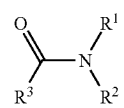

wherein
R1 is selected from the group consisting of a non-aromatic hydrocarbyl group having from 1 to 16 carbon atom and benzyl; R2 is selected from the group consisting of a hydrocarbyl group having from 1 to 4 carbon atoms and benzyl; and R3 is selected from the group consisting of hydrogen and a hydrocarbyl group having from 1 to 16 carbon atoms and c) at least one acyl morpholine according to the formula (II),

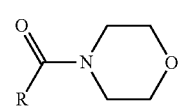

wherein R is H, $CH_3$ or $C_2H_5$.
A method for treating a plant or seed with such formulation is also provided.

18 Claims, No Drawings

(56) References Cited

FOREIGN PATENT DOCUMENTS

WO     2011/080208 A1     7/2011
WO     2011/147822 A2     12/2011

OTHER PUBLICATIONS

European Search Report issued in EP Application No. 11 19 0506.3 dated Apr. 12, 2012.
International Search Report and Written Opinion for PCT/EP2012/073368 dated Mar. 12, 2013.

* cited by examiner

AGRICULTURAL FORMULATIONS WITH AMIDES AND ACYL MORPHOLINES

This application is a National Stage entry of International Application PCT/EP2012/073368, filed Nov. 22, 2012, which claims the benefit of U.S. Patent Application No. 61/563,970, filed Nov. 28, 2011, and European Patent Application No. 11190506.3, filed Nov. 24, 2011. The contents of the aforementioned applications are incorporated herein by reference in their entireties.

FIELD OF INVENTION

The present invention relates to a solvent system comprising an amide, an acyl morpholine, and optionally further components, as a solvent for agriculturally active ingredients. The invention also relates to a formulation comprising an agriculturally active ingredient and such a solvent system.

BACKGROUND OF THE INVENTION

Agriculturally active ingredients, such as pesticides and plant growth regulators, have conventionally been provided to the end-user in different concentrated forms to be diluted in water or other suitable medium to form a dilute ready-to-use formulation by the end-user. Such concentrated forms include solid formulations, e.g. powders, and liquid formulations. In many applications, liquid formulations are preferred as problems of dusting of toxic powders and slow dissolution in the diluent may be avoided.

An emulsion concentrate typically comprises an agricultural active ingredient, a water-insoluble solvent, and an emulsifier, and when added to the water, it spontaneously, or after active mixing, e.g. stirring, forms an oil-in-water emulsion, the agricultural active ingredient primarily being present in the emulsion droplets. This type of concentrated formulation is especially suitable for agricultural actives that are water insoluble/have low water solubility, and where the recommended concentration in the ready-to-use formulation exceeds the solubility of the agricultural active ingredient.

It is important that the agriculturally active ingredient is stably dissolved in the emulsion concentrate. Precipitation of the agriculturally active ingredient may result in a loss of efficacy. Should the agriculturally active ingredient be concentrated to the precipitates, it is prevented from being evenly distributed when sprayed on a field.

There is thus a need in the field to find new and improved, solvents/solvent systems for agriculturally active ingredients, which can be used in agricultural formulations, especially in form of emulsion concentrates.

SUMMARY OF THE INVENTION

One object of the present invention is to meet the needs in the art and to provide a solvent that can be used in agricultural formulations.

Another object of the invention is to provide a solvent for agricultural actives that allows for a concentrated formulation of solvent and agricultural active, in which the agriculturally active ingredient have a reduced tendency to form precipitates.

Another object of the invention is to provide a solvent for agricultural active ingredients that allows for a concentrated formulation of solvent and agricultural active to be mixed with an aqueous medium without or with only minor precipitation of the active ingredient.

The present inventors have now surprisingly found that certain combinations comprising amides and acyl morpholines are suitable as solvent systems for agriculturally active ingredients. These combinations have been useful in emulsifiable concentrated formulations.

In a first aspect, the present invention relates to a formulation comprising
 a) an agriculturally active ingredient,
 b) at least one amide of formula (I):

wherein
 $R^1$ is selected from the group consisting of a non-aromatic hydrocarbyl group having from 1 to 16 carbon atoms and benzyl;
 $R^2$ is selected from the group consisting of a hydrocarbyl group having from 1 to 4 carbon atoms and benzyl; and
 $R^3$ is selected from the group consisting of hydrogen and a hydrocarbyl group having from 1 to 16 carbon atoms,
 c) an acyl morpholine of formula (II),

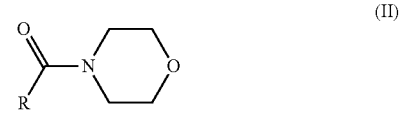

wherein R is H, $CH_3$ or $C_2H_5$,
 d) optionally a polar aprotic solvent different from the amide of formula (I) and an acyl morpholine of formula (II), and
 e) optionally additional components.

The formulation may be a fully or essentially anhydrous formulation or may be an aqueous formulation, such as an emulsion.

In a second aspect, the present invention relates to a method for treating a plant, by contacting said plant with a formulation of the invention.

In a third aspect, the present invention relates to the use of a solvent system comprising an amide of formula (I) and an acyl morpholine of formula (II) and optionally a polar aprotic solvent, as a solvent for an agricultural active.

These and further aspects will now be described further.

DETAILED DESCRIPTION OF THE INVENTION

The agriculturally active ingredients contemplated for use in the present invention, also referred to in the art as agricultural actives, are preferably selected from the group consisting of pesticides and plant growth regulators.

The agriculturally active ingredients are preferably selected amongst those having low water solubility, and most preferably amongst those being water insoluble.

The term "agriculturally active ingredient" as used herein is to be taken as encompassing any organic compound being agriculturally active. However, to the extent that the amides of formula (I), the acyl morpholines of the formula (II) or the polar aprotic co-solvents as defined herein, are agriculturally active, these are not considered as agriculturally active ingredients.

The term "compound having low water solubility" as defined herein, relates to a compound having a solubility of at most 5, such as at most 1 g/l, for example at most 0.7 g/l in water.

In the context of the present invention, water solubility shall be interpreted as being measured according to ASTM E 1148-87 "Standard Test Method for Measurements of Aqueous Solubility".

As used herein, the term "pesticide" refers to a compound that will prevent, destroy, repel, or mitigate any pest.

As used herein, the term "plant growth regulator" refers to a compound, which through physiological action will accelerate or retard the rate of growth or rate of maturation or otherwise alter the behaviour of ornamental or crop plants or the products thereof.

Pesticides and plant growth regulators especially contemplated for use in the present invention are organic compounds, preferably synthetic organic compounds.

Pesticides contemplated for use in the present invention include fungicides, herbicides, insecticides, miticides, nematicides, acaricides, and molluscicides.

Preferred agriculturally active ingredients contemplated for use in the present invention include pesticides and plant growth regulators of the classes triazoles, strobilurins, alkylenebis (dithiocarbamate) compounds, benzimidazoles, phenoxy carboxylic acids, benzoic acids, sulfonylureas, triazines, pyridine carboxylic acids, neonicotinides, amidines, organophosphates, and pyrethroids.

Examples of suitable fungicides of the (present) invention include fungicides of the classes triazoles (e.g. tebuconazole, tetraconazole, cyproconazole, epoxiconazole, difenconazole, propiconazole, prothioconazole), strobilurins (e.g. trifloxystrobin, azoxystrobin, fluoxastrobin, pyraclostrobin), alkylenebis (dithiocarbamate) compounds (e.g. mancozeb) and benzimidazoles (e.g carbendazim).

Examples of suitable herbicides of the (present) invention include phenoxy carboxylic acids (e.g. 2,4-D-acid, MCPA), benzoic acids (e.g. Dicamba-acid), sulfonylureas (e.g. methylsulfuron-methyl, rimsulfuron), triazines (e.g. atrazine and simazine), triazolinones (e.g. amicarbazone) and pyridine carboxylic acids (e.g. triclopyr).

Examples of suitable insecticides of the (present) invention include neonicotinides (e.g. thiamethoxam, clothianidin, thiacloprid, dinotefuran, acetamiprid, nitenpyram, imidacloprid), amidines (e.g. amitraz), organophosphates (e.g. chlorpyrifos) and pyrethroids (e.g. permethrin, bifenthrin, deltamethrin).

For a detailed description of each of the above-mentioned pesticides and plant growth regulators, reference is made to handbooks, e.g. "The e-Pesticide Manual v4.0" from BCPC Publications Ltd, Alton, Hampshire. (ISBN 1 901396 42 8).

Formulations of the present invention comprise at least one amide of formula (I):

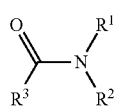

(I)

wherein
$R^1$ is selected from the group consisting of a non-aromatic hydrocarbyl group having from 1 to 16 carbon atoms and benzyl;
$R^2$ is selected from the group consisting of a hydrocarbyl group having from 1 to 4 carbon atoms and benzyl; and $R^3$ is selected from the group consisting of hydrogen and a hydrocarbyl group having from 1 to 16 carbon atoms.

Preferably, when $R^1$ is a hydrocarbyl group having from 1 to 4 carbon atoms or benzyl, then $R^3$ is a non-aromatic hydrocarbyl group having from 5 to 16 carbon atoms.

Preferably, when $R^1$ is a hydrocarbyl group having from 5 to 16 carbon atoms, then $R^3$ is hydrogen, methyl or ethyl In embodiments of the present invention, $R^1$ and $R^2$ are independently methyl or ethyl, preferably methyl, and $R^3$ is a hydrocarbyl group, preferably a straight or branched alkyl or alkenyl group having from 6 to 12 carbon atoms, preferably 7 to 10 carbon atoms. Examples include N,N-dimethyl decanamide and N,N-dimethyl octanamide.

Such amides are known and commercially available or can be synthesized by reacting the appropriate organic acid and an amine according to methods well known in the art.

In embodiments of the present invention, in the amide of formula (I), $R^1$ is a hydrocarbyl group, preferably a straight or branched alkyl or alkenyl group, having from 6 to 12, preferably 8 to 11 carbon atoms, $R^2$ is methyl, ethyl or benzyl, preferably methyl, and $R^3$ is hydrogen, methyl or ethyl, preferably hydrogen. Examples include N-methyl-N-(2-propylheptyl)-formamide, N-methyl-N-(2-propylheptyl)-acetamide, N-methyl-N-(n-decyl)-acetamide, N-methyl-N-(n-decyl)-formamide, N-methyl-N-(monomethyl substituted $C_{9-10}$ alkyl)-acetamide and N-methyl-N-(monomethyl substituted $C_{9-10}$ alkyl)-formamide.

Such amides are known and commercially available or can be synthesized according to known methods, e.g. as described in WO 2011/080208 A1 to Akzo Nobel Chemicals International B.V.

The acyl morpholines contemplated for use in a formulation of the present invention include 4-formyl morpholine (R=H, also referred to as N-formyl morpholine or NFM), 4-acetyl morpholine (R=CH$_3$, also referred to as N-acetyl morpholine or NAM), 4-propionyl morpholine (R=C$_2$H$_5$, also referred to as N-propionyl morpholine or NPM) and mixtures thereof. Preferably, a formulation of the present invention comprises 4-formyl morpholine, and more preferably, 4-formyl morpholine represents at least 50, most preferably at least 90, such as 100 wt % of the acyl morpholines of formula (II) present in the formulation. However, for formulations comprising the pesticide N,N'-bis-[(1-formamido-2,2,2-trichloro)ethyl]piperazine, it is preferred that the acyl morpholine is selected from among 4-acetyl morpholine and 4-propionyl morpholine.

The acyl morpholines as such are well known compounds and are commercially available from standard chemical suppliers.

Polar aprotic solvents, which are different from amides of formula (I) and acyl morpholines of formula (II), herein referred to as "polar aprotic solvents" may be included in formulations of the invention, The polar aprotic solvent is preferably selected from those polar aprotic solvents having a flash point of at least 65° C., as measured according to ASTM D93.

The polar aprotic solvent is preferably selected from the group consisting of a sulfoxide, an amide, a hydrocarbyl- or hydrocarbylene carbonate, and mixtures of two or more thereof. Preferred sulfoxides include dimethyl sulfoxide. Preferred hydrocarbyl carbonates include di-alkyl carbonates, such as those with $C_1$-$C_8$ alkyl chains. Preferred hydrocarbylene-carbonates include alkylene carbonates, more preferably $C_2$-$C_4$-alkylenecarbonates, most preferably propylene carbonate. More preferably, the polar aprotic co-solvent is selected from the group consisting of dimethyl sulfoxide, propylene carbonate and a mixture thereof, most preferably propylene carbonate.

Additional components may be present in the formulation of the invention. Examples of such additional components include one or more adjuvants, such as bioefficacy enhancers that increase the bioefficacy of agricultural actives, humectants, wetting agents, rheology modifiers, surfactants, emulsifiers, stickers, drift reducers and/or other additional components conventionally used in agricultural compositions.

Water is not contemplated for use as a member of the above "additional components. A formulation of the present invention may be a fully or essentially anhydrous formulation, such as comprising less than 10, preferably less than 1 wt % of water, or may be an aqueous formulation, such as an emulsion, typically an oil-in-water emulsion, usually comprising at least 90, such as at least 99 wt % water, based on the total weight of the formulation of the invention.

The concentration of such one or more agriculturally active ingredient in a formulation of the present invention is typically within the solubility range of the specific compound in the specific solvent system.

The concentration of the agriculturally active ingredient in a formulation of the present invention is typically from about 0.1, such as from about 10, for example from about 20, to about 950, such as to about 500, for example to about 300 g/l based on the total volume of an anhydrous formulation of the invention.

In representative formulations of the present invention, the concentration of the at least one agriculturally active ingredient in such a composition is from 50 to 250 g/l.

The concentration of the amide, of the formula (I) in a formulation of the present invention is typically from 25, such as from 50, for example from 100, to 900, such as to 700, for example to 500 g/l based on the total volume of an anhydrous formulation of the invention.

When a polar aprotic solvent is present, the weight ratio between acyl morpholine of formula (II) and polar aprotic solvent is typically from 5:95, from 30:70, from 50:50, from 70:30, or from 75:25, to 95:5, to 90:10, or to 85:15. For example, the weight ratio between acyl morpholine of formula (II) and polar aprotic solvent may be about 80:20.

A formulation of the present invention typically comprises from about 10, such as from 50, for example 100, to about 600, such as to about 400, for example to about 250 g/l of the total of c) acyl morpholine of the formula (II) and, if present, d) polar aprotic co-solvent, based on the total volume of an anhydrous formulation of the invention.

If present, the concentration of additional components in a formulation of the present invention is typically from 10, such as from 20, for example from 50, to 250, such as to 150, for example to 100 g/l based on the total volume of an anhydrous formulation of the invention.

The formulations according to the invention are typically prepared in such a manner that the components are mixed with one another in the desired ratios and to the desired concentrations. In general, the formulations are prepared at a temperature of between 10 and 50° C. Suitable apparatuses that are employed for the preparation of agricultural formulations are suitable as apparatuses for the preparation of the formulations of the present invention.

The composition of the present invention may be an emulsifiable concentrated composition, hereinafter and in the art commonly referred to as an "emulsifiable concentrate", or "EC", comprising a formulation as defined herein, including an emulsifying agent. Hence, such an emulsifiable concentrate comprises an agriculturally active ingredient, an amide of the formula (I), an acyl morpholine of the formula (II), optionally a polar aprotic co-solvent, and an emulsifier.

In an emulsifiable concentrate, the concentration of agriculturally active ingredient is typically too high for end-use, and the emulsifiable concentrate is intended to be diluted with an aqueous medium into a work-composition.

An emulsifiable concentrate of the invention preferably comprises water in an amount below the amount at which an oil-in-water emulsion is formed. Preferably, the emulsifiable concentrate comprises less than about 10, more preferably less than about 1 wt % of water, based on the total weight of the emulsifiable concentrate. Most preferably, the emulsifiable concentrate of the present invention is essentially free from water in the sense that the emulsifiable concentrate does not contain water beyond what is inevitable from the equilibrium with the surrounding atmosphere.

Emulsifiers contemplated for use in the present invention include surfactants known as emulsifying agents by those skilled in the art, such as, anionic surfactants, non-ionic surfactants, polymers, and blends of two or more thereof, especially blends comprising anionic and non-ionic surfactants.

Examples of non-ionic surfactants contemplated for use as emulsifying agents in the present invention include alkoxylated, preferably ethoxylated and/or propoxylated alcohols, preferably containing from 8 to 22 carbon atoms; alkyl(poly)glycosides, such as straight or branched $C_4$-$C_{10}$ alkyl(poly)glycosides; alkoxylated, preferably ethoxylated, sorbitan or sorbitol esters; castor oil ethoxylates; and tristyrylphenol alkoxylates.

Preferred ethoxylated alcohols have a degree of ethoxylation of from 1 to 50, more preferably 2 to 20, most preferably 3 to 10. Some alkoxylated alcohols contemplated for use in the present invention include those based on branched alcohols, such as the Guerbet alcohols, e.g. 2-propylheptanol and 2-ethylhexanol, and $C_{10}$- or $C_{13}$—OXO-alcohols, i.e. an alcohol mixture whose main component is formed by at least one branched $C_{10}$- or $C_{13}$-alcohol, and the alcohols commercially available as Exxal alcohols from Exxon Mobile Chemicals and Neodol alcohols from Shell Chemicals.

Examples of anionic surfactants contemplated for use as emulsifying agents in the present invention include sulfosuccinates, alkylbenzene sulfonic acid salts, such as calcium or sodium dodecylbenzene sulfonate, alkyl sulphonates, alkyl ether sulphates, phosphate esters of optionally alkoxylated, preferably ethoxylated and/or propoxylated, alcohols, xylene and cumene sulfonate salts, and naphthalene or alkylnaphthalene sulfonates, which may be condensated, or combinations thereof.

Examples of polymers for use alone or in combination as emulsifying agent include ethylene oxide-propylene oxide block co-polymers, acrylic acid based comb polymers, and xanthan gum.

In an emulsifiable concentrate of the present invention, the concentration of emulsifier is typically from 10, such as from 50, to 200 such as to 150 g/l based on the total volume of an anhydrous formulation of the invention.

The present invention also relates to an aqueous, typically oil-in-water, emulsion comprising an aqueous medium, at least one agriculturally active ingredient, preferably having low water solubility, an amide of formula (I), an acyl morpholine according to the formula (II), an emulsifier and, optionally, a polar aprotic solvent and/or additional components.

For example, such an emulsion may be obtained by mixing an aqueous medium and an emulsifiable concentrate as previously defined herein or by separately mixing the components.

As used herein, the term "emulsion" shall be interpreted to include macro emulsions, nano emulsions, micro emulsions and suspoemulsions, i.e. emulsions in which a particulate solid is suspended.

The aqueous medium that is a component of the emulsion of the present invention typically comprises water as the major component. Preferably, water constitutes at least 50 wt % such as at least 75 wt %, for example at least 90 wt % of the aqueous medium. The aqueous medium may further comprise other components, such as salts, buffering agents, pH-controlling agents, such as acids or bases, fertilizers, etc.

When the emulsifiable concentrate is mixed with the aqueous medium, an emulsion is formed, the emulsion typically being the work composition that will be used by the end-user, with the advantage that the end-user does not have to handle and store large quantities of work composition, but can prepare the amounts necessary for the moment.

Emulsions of the present invention typically are prepared by mixing an emulsifiable concentrate of the invention with an aqueous medium at a volume ratio between the emulsifiable concentrate and aqueous medium of from about 1:25, preferably from about 1:50, more preferably from about 1:100; to about 1:1000, preferably to about 1:500, more preferably to about 1:300. In a representative emulsion of the present invention, the volume ratio emulsifiable concentrate:aqueous medium is about 1:200.

An advantage of the present invention is that the agriculturally active ingredient exhibit a lower, or no, tendency to precipitate or crystallise when the formulation is in concentrated form, i.e. comprising less than 10 wt % water, preferably less than 1 wt % water Another advantage of the present invention is that even at high dilutions in the emulsion, i.e. at low ratios between the formulations and the aqueous medium, the tendency of the agriculturally active ingredient to precipitate or crystallise is low, also at temperatures significantly below room temperature, such as at 5° C. This is advantageous for many reasons. Should it be necessary for the end-user to stop spraying before having consumed a full batch of emulsion, the unused emulsion will be possible to use later, for example the next day, even if the unused emulsion was stored at reduced temperatures.

In a further aspect, the present invention provides a method for treating a plant or seed, wherein the plant or seed is contacted with a formulation of the invention. The desired amount of agriculturally active ingredient to be contacted with a plant or seed by means of such method depends on several parameters, such as the biological activity of the agriculturally active, but generally, the amount is adjusted to be sufficient for the agriculturally active ingredient to perform its desired activity.

As used herein, "plant" includes all parts of a plant, including roots, stems, leaves, flowers and fruits.

In one embodiment of the treatment method, the plant or seed is contacted with a formulation of the present invention, usually an oil-in-water emulsion, by means of spraying.

In another embodiment of the treatment method, a plant or a seed, usually a seed, is contacted with a formulation of the invention by dipping or soaking the plant or seed in the formulation.

EXPERIMENTS

Experiment 1

To obtain the formulations disclosed in tables 1 to 3, agriculturally active ingredients (AI) was added to a measuring flask along with N-formyl morpholine (NFM), propylene carbonate (PC) and emulsifier to the indicated amounts. N,N-dimethyl decanamide or N-decyl-N-methyl formamide was then added so that the whole mixture amounted to 1 l. The emulsifier was 2-ethyl hexanol alkoxylated with 35 moles propylene oxide and 32 moles ethylene oxide per mole alcohol (2EH+35PO+32EO) and Calcium dodecyl bensen sulfonated in a 5:3 weight:weight ratio.

The mixture was stirred with a magnetic stirrer until the active dissolved in the formulation. Finished formulations were put into a refrigerator for seven days at 0° C.

All formulations were judged by the naked eye if it contained any crystals after the storing. The composition of each formulation and the results are summarized in the tables 1-3 below.

TABLE 1

| Formul. | AI | Emulsifier | NFM g/l | PC g/l | N,N-dimethyl decanamide | N-decyl-N-methyl formamide | Crystals formed |
|---|---|---|---|---|---|---|---|
| 1* | 100 g/l Fenbuconazole | 65 g/l | 0 | 0 | Up to 1 l | | Yes |
| 2 | 100 g/l Fenbuconazole | 65 g/l | 100 | 0 | Up to 1 l | | No |
| 3 | 100 g/l Fenbuconazole | 65 g/l | 80 | 20 | Up to 1 l | | No |
| 4 | 100 g/l Fenbuconazole | 65 g/l | 60 | 40 | Up to 1 l | | No |
| 5* | 100 g/l Fenbuconazole | 65 g/l | 0 | 0 | | Up to 1 l | Yes |
| 6 | 100 g/l Fenbuconazole | 65 g/l | 100 | 0 | | Up to 1 l | No |
| 7 | 100 g/l Fenbuconazole | 65 g/l | 80 | 20 | | Up to 1 l | No |

TABLE 1-continued

| Formul. | AI | Emulsifier | NFM g/l | PC g/l | N,N-dimethyl decanamide | N-decyl-N-methyl formamide | Crystals formed |
|---|---|---|---|---|---|---|---|
| 8 | 100 g/l Fenbuconazole | 65 g/l | 60 | 40 | | Up to 1 l | No |

*Comparative experiment

TABLE 2

| Formul. | Pesticide | Emulsifier | NFM g/l | PC g/l | N,N-dimethyl decanamide | Crystals formed |
|---|---|---|---|---|---|---|
| 9* | 100 g/l Imidachloprid | 65 g/l | 0 | 0 | Up to 1 l | Yes |
| 10 | 100 g/l Imidachloprid | 65 g/l | 500 | 0 | Up to 1 l | No |
| 11 | 100 g/l Imidachloprid | 65 g/l | 400 | 100 | Up to 1 l | No |
| 12 | 100 g/l Imidachloprid | 65 g/l | 300 | 200 | Up to 1 l | No |
| 13* | 100 g/l Imidachloprid | 65 g/l | 0 | 500 | Up to 1 l | Yes |

*Comparative experiment

TABLE 3

| Formul. | Pesticide | Emulsifier | NFM | PC | N,N-dimethyl decanamide | Crystals formed |
|---|---|---|---|---|---|---|
| 14* | 350 g/l Cyhalofop-butyl | 65 g/l | 0 | 0 | Up to 1 l | Yes |
| 15 | 350 g/l Cyhalofop-butyl | 65 g/l | 80 | 20 | Up to 1 l | No |
| 16 | 350 g/l Cyhalofop-butyl | 65 g/l | 60 | 40 | Up to 1 l | No |

*Comparative experiment

From the results, it is evident that the inclusion of acyl morpholine and optionally polar aprotic solvent in the amide solvent reduces the formation of crystals, and that leaving out the acyl morpholine does not give satisfactory results.

Experiment 2

Emulsion Dilution

Formulations containing 100 g/l of Fenbuconazole were formulated together with 65 g/l of surfactant blend (47 wt % polyoxypropylene polyoxyethylene block copolymer, 56 PO/60 EO, 20 wt % dodecyl benzene sulfonate, 33 wt % HD ocenol (60/65) ethoxylate, 23 EO) and diluted as follows:
1) N-formylmorfolin:propylene carbonate (in the weight ratio 4:1) up to 1 liter
2) N-formylmorfolin:propylene carbonate (in the weight ratio 4:1) 100 g/l and up to 1 liter with N,N dimethyl decanamide Each formulation was emulsified into water (342 ppm $CaCO_3$-eq) at ambient temperature (~22° C.) in the volume ratio (formulation:water) 5 ml:95 ml dilution. The emulsions were poured into 100 ml glass test tubes and evaluated for stability by measuring the volume of creaming/oil/sedimentation visible in the test tubes after 2 hours. The appearance was judged by ocular inspection with the naked eye and the results can be seen in table 4

TABLE 4

| Formulation | Appearance after 2 hrs |
|---|---|
| 17* | 5 ml oil |
| 18 | No cream/oil or sedimentation |

*Comparative experiment

The invention claimed is:
1. An emulsifiable concentrate formulation comprising:
a) at least one agriculturally active ingredient;
b) at least one amide of formula (I):

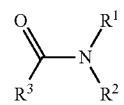

wherein
$R^1$ is selected from the group consisting of a non-aromatic hydrocarbyl group having from 1 to 16 carbon atom and benzyl;
$R^2$ is selected from the group consisting of a hydrocarbyl group having from 1 to 4 carbon atoms and benzyl; and
$R^3$ is selected from the group consisting of hydrogen and a hydrocarbyl group having from 1 to 16 carbon atoms,
wherein
when $R^1$ is a hydrocarbyl group having from 1 to 4 carbon atoms or benzyl, then $R^3$ is a non-aromatic hydrocarbyl group having from 5 to 16 carbon atoms, and when $R^1$ is a hydrocarbyl group having from 5 to 16 carbon atoms, then $R^3$ is hydrogen, methyl or ethyl,
c) at least one acyl morpholine according to the formula (II),

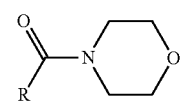

wherein R is H,
d) an emulsifier.
2. A formulation according to claim 1, wherein said emulsifier is selected from the group consisting of anionic surfactants, non-ionic surfactants, polymers and mixtures thereof.
3. A formulation according to claim 1, wherein said agriculturally active ingredient is selected from the group consisting of triazoles, strobilurins, alkylenebis(dithiocarbamate) compounds, benzimidazoles, phenoxy carboxylic acids, benzoic acids, sulfonylureas, triazines, pyridine carboxylic acids, neonicotinides, amidines, organophosphates, pyrethroids and mixtures thereof.

4. A formulation according to claim 1, wherein $R^1$ and $R^2$ independently are methyl or ethyl and $R^3$ is a hydrocarbyl having from 6 to 12 carbon atoms.

5. A formulation according to claim 1, wherein $R^1$ is a hydrocarbyl having from 8 to 12 carbon atoms, $R^2$ is methyl, ethyl or benzyl, and $R^3$ is hydrogen, methyl or ethyl.

6. A formulation according claim to 1, further comprising d) at least one polar aprotic solvent different from an amide of formula (I) and an acyl morpholine of formula (II), selected from the group consisting of a sulfoxide, an amide, a hydrocarbyl carbonate, a hydrocarbylene carbonate and mixtures thereof.

7. A formulation according to claim 1, wherein said emulsifier is present in the formulation at a concentration between about 10 and 200 g/l, based on the total volume of an anhydrous formulation.

8. A formulation according to claim 1, comprising an acyl morpholine of formula (II) which is N-formyl morpholine and a polar aprotic solvent different from an amide of formula (I) and an acyl morpholine of formula (II), which is propylene carbonate.

9. A formulation according to claim 2, wherein the anionic surfactant is selected from the group consisting of sulfosuccinates, alkylbenzene sulfonic acid salts, alkyl sulphonates, alkyl ether sulphates, phosphate esters of alkoxylated alcohols, phosphate esters of alcohols, xylene and cumene sulfonate salts, naphthalene, alkylnaphthalene sulfonates and mixtures thereof.

10. A formulation according to claim 1, further comprising e) at least one additional component selected from the group consisting of adjuvants, surfactants, wetting agents, rheology modifiers and mixtures of two or more thereof.

11. A formulation according to claim 1, comprising:
from 10 to 800 g/l of a);
from 50 to 900 g/l of b);
from 10 to 600 g/l of c) and
from 10 to 250 g/l of d);
based on the total volume of an anhydrous formulation.

12. A formulation according to claim 2, wherein the non-ionic surfactant is selected from the group consisting of alkoxylated alcohols, alkyl(poly)glycosides, alkoxylated sorbitan or sorbitol esters, castor oil ethoxylates, tristyrylphenol alkoxylates and mixtures thereof.

13. A formulation according to claim 1 comprising at most 10 wt % water based on the total weight of the formulation.

14. A formulation according to claim 1 comprising at least 90 wt % water based on the total weight of the formulation.

15. A method for treating a plant or seed, comprising contacting said plant or seed with a formulation according to claim 1.

16. A formulation according to claim 13 comprising at most 1 wt % water, based on the total weight of the formulation.

17. A formulation according to claim 2, wherein the polymer is selected from the group consisting of ethylene oxide-propylene oxide block co-polymers, acrylic acid based comb polymers, xanthan gum and mixtures thereof.

18. A method to dissolve an agriculturally active ingredient comprising contacting said agriculturally active ingredient with a solvent system comprising:
(i) at least one amide of formula (I):

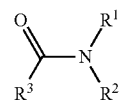

wherein
$R^1$ is selected from the group consisting of a hydrocarbyl group having from 1 to 16 carbon atoms and benzyl;
$R^2$ is selected from the group consisting of a hydrocarbyl group having from 1 to 4 carbon atoms and benzyl; and
$R^3$ is selected from the group consisting of hydrogen and a hydrocarbyl group having from 1 to 16 carbon atoms, wherein when $R^1$ is a hydrocarbyl group having from 1 to 4 carbon atoms or benzyl, then $R^3$ is a non-aromatic hydrocarbyl group having from 5 to 16 carbon atoms, and when $R^1$ is a hydrocarbyl group having from 5 to 16 carbon atoms, then $R^3$ is hydrogen, methyl or ethyl (ii) an acyl morpholine according to the formula (II),

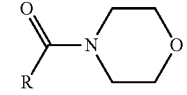

wherein R is H,
(iii) optionally a polar aprotic solvent different from an amide of formula (I) and an acyl morpholine of formula (II), and
(iv) an emulsifier.

* * * * *